United States Patent [19]

Lillich

[11] Patent Number: 5,790,856
[45] Date of Patent: Aug. 4, 1998

[54] METHODS, APPARATUS, AND DATA STRUCTURES FOR DATA DRIVEN COMPUTER PATCHES AND STATIC ANALYSIS OF SAME

[75] Inventor: Alan W. Lillich, Los Gatos, Calif.

[73] Assignee: Apple Computer, Inc., Cupertino, Calif.

[21] Appl. No.: 436,945

[22] Filed: May 8, 1995

[51] Int. Cl.$^6$ .................................................. G06F 9/45
[52] U.S. Cl. .................................... 395/703; 395/712
[58] Field of Search .............................. 395/700, 650, 395/705, 710, 712, 653, 703

[56] References Cited

U.S. PATENT DOCUMENTS

| | | | |
|---|---|---|---|
| 5,155,847 | 10/1992 | Kirouac et al. | 395/600 |
| 5,325,533 | 6/1994 | McInerney et al. | 395/700 |
| 5,359,730 | 10/1994 | Marron | 395/650 |
| 5,369,766 | 11/1994 | Nakano et al. | 395/700 |
| 5,369,770 | 11/1994 | Thomason et al. | 395/725 |
| 5,375,241 | 12/1994 | Walsh | 395/700 |
| 5,408,665 | 4/1995 | Fitzgerald | 395/700 |
| 5,481,713 | 1/1996 | Wetmore et al. | 395/705 |
| 5,519,866 | 5/1996 | Lawrence et al. | 395/700 |

OTHER PUBLICATIONS

Thompson et al., "Apple, IBM Bring Power To the Desktop," Byte Magazine, Apr. 1994, p. 44, vol. 19, No. 4.

Thelen, Randy, "Under the Hood: the Power Mac's Run-Time Architecture," Byte Magazine, Apr. 1994, p. 131, vol. 19, No. 4.

Apple Computer Inc., "Insided Macintosh: PowerPC System Software," Addison-Wesley Publishing Co, pp. 1–20—1–34 and pp. 1–66—1–68, 1994.

"Inside Macintosh: PowerPC System Software," Apple Computer, Inc., 1994, Addison-Wesley Publishing Company.

*Primary Examiner*—Kevin A. Kriess
*Assistant Examiner*—Peter J. Corcoran, III
*Attorney, Agent, or Firm*—Hickman Beyer & Weaver,LLP

[57] ABSTRACT

The present invention teaches a variety of methods, apparatus and data structures for providing data driven patching. According to one embodiment, patches are stored in a known format in a discernible location. In the described embodiment, each fragment code may have a corresponding patch library. This enables the patches to be located and analyzed in a quiescent state. In a method aspect of the present invention, the operating system, or a separate utility program, can evaluate and selectively add patches. Therefore, the present invention introduces a patch integrity validation layer into the patching process. In another method aspect, the invention teaches evaluating the patches in a quiescent state whereby the patches introduced by a program or a combination of programs may be exhaustively evaluated prior to execution.

41 Claims, 10 Drawing Sheets

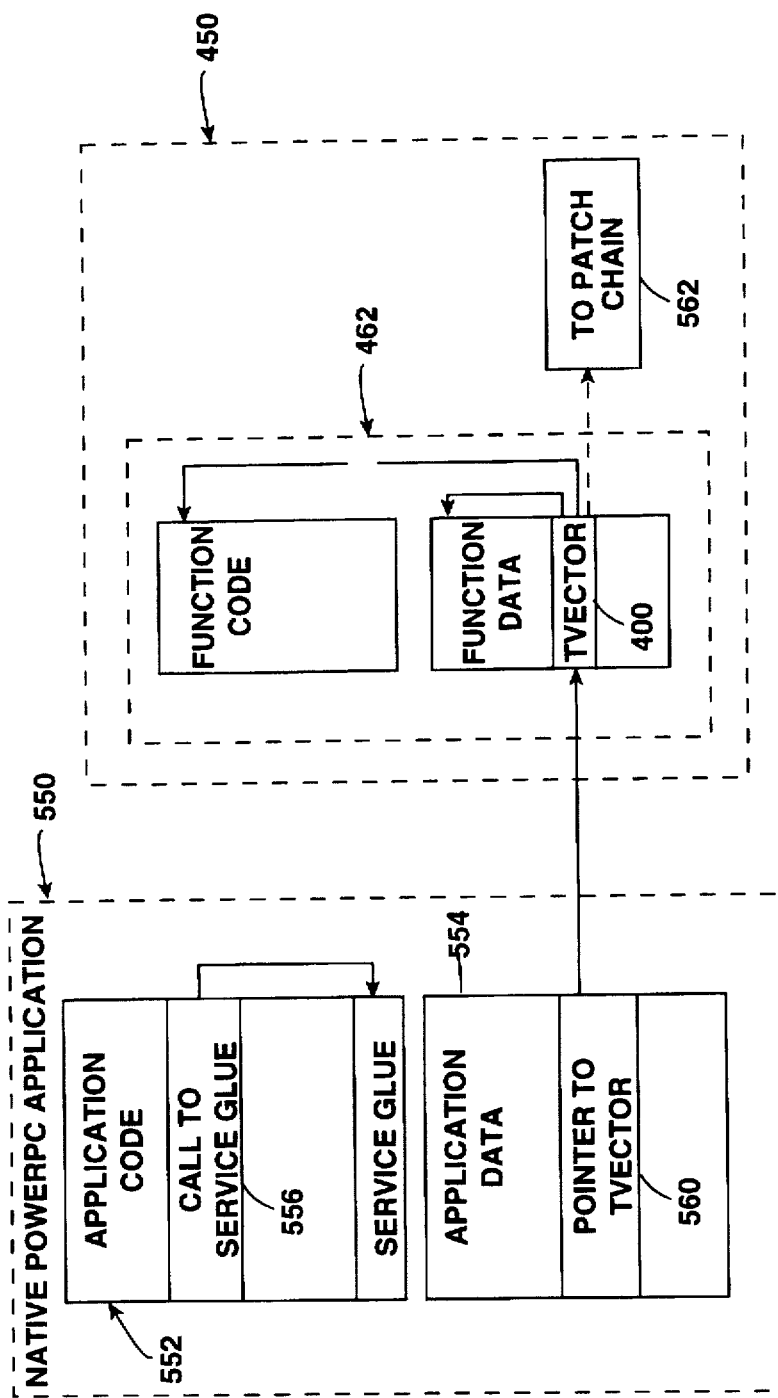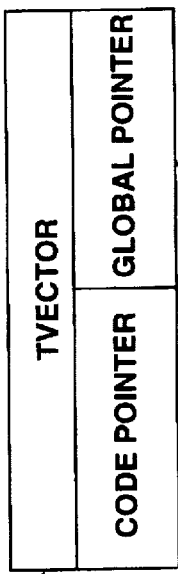

METHODS, APPARATUS, AND DATA STRUCTURES FOR DATA DRIVEN COMPUTER PATCHES AND STATIC ANALYSIS OF SAME

CROSS REFERENCE TO RELATED APPLICATION

This application is related to Lillich et. al.'s U.S. patent application Ser. No. 08/435,360, now issued as U.S. Pat. No. 5,619,698, entitled "METHODS AND APPARATUS FOR PATCHING OPERATING SYSTEMS", filed May 5, 1995, and commonly assigned with the present invention.

TECHNICAL FIELD

This invention relates generally to computer operating systems, and more particularly to methods and apparatus for providing computer operating system patches.

BACKGROUND ART

Computer operating systems often allow applications to install "patches" within the operating system code. A "patch", as used in the art, is a piece of computer code and/or data which replaces or augments a function already implemented on the computer. Often, multiple patches may be installed which cooperatively modify the original given function.

When a patch replaces a function, any client calls made to the function are transparently (from the clients perspective) redirected to the patch. The patch in turn performs the requested service and, if necessary, returns any results of the call to the client. In a similar manner, when a patch augments a function, any client calls made to the function are redirected to the patch. The patch then performs any preprocessing and passes the call along to the function. The function will return results directly to its immediate caller. If desired, the patch may perform post-processing and, if necessary, return the results of the call to the client.

With reference to FIG. 2, the well known 68K patching paradigm 100 will be described. By way of background, the 68K patching paradigm 100 is implemented by versions of the Macintosh® Operating system designed for the Motorola 68K series of microprocessors, which operating system is hereinafter referred to as the "68K operating system." The paradigm 100 is implemented on a computer system such as computer system 50 of FIG. 1, wherein a CPU 52 includes one of the Motorola 68K series microprocessors or microcontrollers as well as other components necessary to properly interface with and control other devices coupled with the CPU 52.

The system routines for the 68K operating system reside mainly in ROM. However, to provide flexibility for any subsequent development, application code written for execution within the 68K operating system must be kept free of any specific ROM addresses. For this reason, all calls to system routines are passed indirectly through a trap table resident in RAM. This indirect mechanism permits the ROM addressing of system routines to vary, or to be replaced by patch routines, without affecting the operation of applications which utilize the system routines.

The 68K patching paradigm 100 includes application code 102 having at least one ATRAP instruction 104, low memory locations 106, a trap dispatcher 108, a trap table 110, ROM 120 having system code 122, and RAM 130 including at least one patch code 132. While the operating system routines reside mainly in ROM 120 (in their original state), information regarding the locations of the operating system routines is encoded in compressed form within ROM 120. Upon system start up, this information is decompressed and the trap table 110 is formed in RAM 130.

The indirect calling mechanism of the 68K patching paradigm 100 is further implemented by utilizing a feature of the 68K series microprocessor called a trap. A "trap" is a kind of microprocessor exception which arises in response to the execution of certain machine language instructions. An "exception" is an error or abnormal condition detected by the processor during the course of execution. For example, any 68K machine language instruction whose first four bits has the hexadecimal value "A" will generate an exception (hence the name "ATRAP"). In the 68K operating system, the set of language instructions whose first four bits has the hexadecimal value "A" are specifically set aside by the operating system for use in implementing client calls to system routines.

During execution of application code 102, the 68K microprocessor will encounter and execute the ATRAP 104. In response, the microprocessor pushes some state onto the computer system's stack, the state including the address of the ATRAP instruction 104. Then, the microprocessor resumes execution at the address indicated in a low memory location, which is the address of the trap dispatcher 108. Once executing, the trap dispatcher 108 examines the bit pattern of the ATRAP instruction 104 to determine what operation it stands for, looks up the address of the corresponding system routine in the trap table 110, and then jumps to the corresponding system routine.

One example of the general execution path of a system routine which is not patched is symbolized by flow control lines 140, 142, 144, 146, and 148. Note that in certain cases the flow control lines may imply structure. For example, the flow control line 146 has its tail at address__1 in trap table 110 and its head at the beginning of the system routine within the system code 120: right to where address__1 points. However, the flow control lines in general are not intended to illustrate structure.

Flow control line 140 symbolizes the microprocessor pushing the address of the ATRAP instruction 104 onto the computer system's stack and beginning execution at the trap dispatcher 108. Flow control line 142 symbolizes the trap dispatcher 108 evaluating the ATRAP instruction 104 and flow control line 144 symbolizes the trap dispatcher looking up the corresponding system routine in the trap table 110. Flow control line 146 symbolizes jumping to a system routine 123 to which address__1 points and flow control line 148 symbolizes jumping back to the application code 102 once the system routine 123 has been executed.

Because the trap table 110 is resident in RAM 130, individual entries in the trap table 110 can be changed to point to addresses other than the original ROM addresses. This allows the system routines to be replaced or augmented by patches. At startup time the system can load new versions of individual routines (e.g. from the System file or from a floppy disk) into RAM and then patch the trap table in order to redirect any calls to the original system routine to the new versions. Additionally, when new applications are launched they too can load new versions of individual routines into RAM and then patch the trap table in order to redirect any calls to the original system routine to the new versions.

One example of a redirection to a patched system routine is symbolized in FIG. 2 by dashed flow control lines 150 and 152. Similar to the non-patched system routine described previously, an ATRAP instruction 104 calling a patched system routine will initiate a process in which the trap dispatcher 108 will look up the system routine corresponding to the ATRAP instruction 104. However, in the patched case, address_1 will point to patch code 132 located in RAM 130 rather than the original system routine. Thus dashed flow control line 150 illustrates jumping to the patch code 132 and dashed flow control line 152 illustrates jumping back to the application code 102 after the patch code 132 has finished executing.

The 68K operating system provides what is termed a static linked computing environment. In the static computing environment all elements of the code are linked and bound prior to producing the final application which is then fully prepared to execute at runtime. Statically linked computing environments contrast with a very different type of operating system architectures known as dynamically linked environments.

In the dynamically linked computing environment, the basic unit of executable code and its associated data is termed a "fragment" or a "dynamically linked library (DLL)." Before any fragment can be executed on a computer system, it must be loaded into the computer system's memory and prepared for execution. Fragment preparation consists mainly of resolving at runtime any import symbols in the fragment that reference code or data exported by other fragments. The resolution of import symbols is accomplished through a process called "binding" wherein the address of the code or data corresponding to the import symbol is found and stored in the fragment by a "binding manager", which is a service typically provided by the operating system.

The resolved symbols are often stored in a "table of contents" format having a pointer to each routine or data item that is imported from some other fragment, as well as pointers to the fragment's own static data. These pointers are then used to properly execute the fragment. Once prepared, the initial fragment (termed the "root fragment") plus all subsequently bound fragments make up an executable process.

In the world of Macintosh®, DLLs can be loosely divided into three different categories: applications, import libraries, and extensions. Typically, applications are fragments which have a user interface and are designed to function interactively with the user. Often applications do not export symbols to other fragments but rather serve as a root fragments, providing some root functionality and importing other necessary functionality.

In contrast, import libraries typically contain code and data generated solely for the purpose of being accessed by other fragments. For example, an import library entitled TrigLib may include export symbols such as sin, cos, and tan. If an application program wishes to use these functions, the application would just include TrigLib's sin, cos, and tan as import symbols. Then when the application program is launched, the binding manager resolves all import symbols (e.g. those from TrigLib) listed in the application. In one example, the symbol resolution is performed by creating a connection to TrigLib by way of the application's table of contents.

Extensions, the third category of fragments, are those fragments which enhance or extend the functionality of other fragments. Extensions are different than import libraries in that extensions must be known by the root fragment or subsequent DLLs and explicitly connected during the execution of the new process. Thus the binding manager is not explicitly responsible for resolving the interconnection between extension DLLs and other types of DLLs.

Once an application has been launched and the binding manager has completed preparation, the end result is a new, self-sufficient executable process with an associated data closure. The closure contains a root fragment as well as instances of all the import libraries required to resolve all the import symbols present in both the root fragment and the import libraries. In explanation, the root fragment is the fragment which includes some root functionality as well as a list of import symbols.

In reference FIG. 3, the well known PowerPC patching paradigm 300 for one dynamically linked computing environment will be described. By way of background, the PowerPC patching paradigm 300 is implemented by versions of the Macintosh® Operating system designed for the PowerPC series of microprocessors, which operating system is hereinafter referred to as the "PowerPC operating system." The paradigm 300 is implemented on a computer system such as computer system 50 of FIG. 1, wherein the CPU 52 includes one of the PowerPC series microprocessors as well as other components necessary to properly interface with and control the other devices.

The example PowerPC patching paradigm 300 includes a native PowerPC application 302, an emulated segment 304, an interface library 306, a native PowerPC system routine 308, and a routine descriptor 310. In the PowerPC native environment, a "fragment" is a block of executable PowerPC code and its associated data. As illustrated, the native PowerPC application 302 is a fragment having application code 320 and application data 322.

In the native PowerPC environment, rather than directly calling system routines, application code will have a call 324 to service glue 326. As will be appreciated by those skilled in the art, service glue 326 provides an indirection across dynamically linked library boundaries. The main function of the service glue is to save memory resources. That is, if the system routine were called more than once, the service glue 326 plus the multiple calls require less memory than duplicating service glue 326 in multiple locations. The service glue in turn uses a pointer 328 found in the application data 322 which points to the transition vector 330 of the interface library 306.

In explanation, a transition vector such as transition vector 330 is a data structure which has two pointers: a code pointer (which is the address of the code of the fragment being called) and a global pointer (which is the address of the called fragment's table of contents). A fragment's "table of contents" is a table containing a pointer to each routine or data item that is imported from some other fragment, as well as pointers to the fragment's own static data.

The interface library 306 is a fragment including interface library code 332 and interface library data 334. The interface library 306 serves a function similar to the trap dispatcher 108 of FIG. 2, as is described in the following. When the service glue 326 is called to execute a system routine, the interface library code 332 is invoked via the interface transition vector 330. Then the interface library 306 evaluates the call using a trap table 340 to determine the appropriate system routine to jump to. The trap table 340 is used in a manner similar to the trap table 110 of FIG. 2.

The appropriate system routine as determined by the interface library 306 may be written in 68K type code such as 68K code 344 or may be in native PowerPC code (i.e. dynamically linked library type code). In the case of 68K code, execution via the trap table 340 to the 68K code 344. In the case of native PowerPC code, execution proceeds via a routine descriptor 310. As used herein, a "routine descriptor" is a data structure which contains mode information necessary for the operating system to properly execute the code. By way of explanation, the PowerPC operating system has an emulator which allows 68K code to be properly executed. In the case of 68K code, execution proceeds via the trap table 340, a mixed-mode manager, and an emulator to interpret and execute the 68K code 344. The routine descriptor is one component of this mechanism.

Patching in the PowerPC patching paradigm 300 is performed in a manner similar to the 68K patching paradigm 100 of FIG. 2. That is, a patch is added by changing an element in the trap table 340 to redirect any system calls to patch code residing in RAM. Thus the PowerPC patching paradigm 300 functions by emulating the appropriate elements of the 68K patching paradigm 100 of FIG. 2. For a more detailed description of the PowerPC operating system including patching and TVectors, see "Inside Macintosh: PowerPC System Software" ©1994 Apple Computer, Inc., published by Addison-Wesley, which is incorporated herein by reference in its entirety.

Each of the above discussed patching paradigms implements what is hereinafter termed "program driven patching." By way of explanation, the patches of the prior art are installed automatically and, in essence, blindly, by the operating system whenever a program (whether it's an application, a utility, etc.) requests that a patch be installed. While this satisfies the program's request to install the patch, it leaves the operating system and other programs running on the operating system exposed to the unknown fallout of the new patch.

Program driven patching has three specific faults. First, the operating system does not know who is doing the patching. Second, the operating system does not know what functions are patched. Thirdly, the operating system cannot control the order in which patches are installed.

Note that while it is possible to implement dynamic patch analyzers, the dynamic patch analyzer will not solve the three mentioned faults for a variety of reasons. The most obvious reasons include (a) the patch is already installed and cannot be removed and (b) the installed patches may have already caused errors. A more subtle reason stems from the nature of software. Even when executing, a program does not necessarily exhibit all its potential characteristics. Particularly, a program may contain conditional paths (paths executed only if specific conditions are met) which install patches. If a conditional path has not encountered the condition which causes installation of the patch, then the dynamic patch analyzer will not provide insight into the potential functionality or errors caused by the non-installed patch.

What is needed is an operating system architecture which provides a layer of patch integrity verification and a corresponding strategy for evaluating patches prior to installation.

DISCLOSURE OF THE INVENTION

To achieve the foregoing and other objectives and in accordance with the present invention, a variety of methods, apparatus and data structures are herein disclosed. A first embodiment of the present invention teaches a computer implemented process having a dynamically linked and patched library structure. The computer implemented process includes a root code fragment including root functionality for a desired process, an import library code fragment linked to the root code fragment by the at least one library import symbol, and a patch library code fragment including a patch description data structure having at least one patch descriptor which indicates a patch which is intended to affect a given function utilized by the desired process. The root code fragment includes a main symbol and at least one import symbol, wherein the main symbol is used to launch the desired process after it has been bound to any import library code fragments that it requires.

In accordance with one aspect of the present invention, a method for binding a computer implemented process having a dynamically linked and patched library structure is disclosed. The binding method includes the steps of retrieving a root code fragment including root functionality for a desired process, the root code fragment including a main symbol and a list of import symbols, retrieving all import library code fragments linked to the root code fragment due to the inclusion of a symbol in the library code fragment that corresponds to a symbol in the list of import symbols, determining which patch library code fragments are linked to the retrieved import library code fragments, each of the patch library code fragments including a patch description data structure having at least one patch which affects a given function utilized by the desired process, binding all import library code fragments that are linked to the root fragment to the root fragment, and installing the at least one patch to affect the use of the given function by the desired process such that a call made by the desired process to the given function is re-directed to the patch.

In a another aspect of the invention, a method for statically testing a computer implemented process having a dynamically linked and patched library structure is taught. The method includes the steps of retrieving a root code fragment including root functionality for a desired process, the root code fragment including a main symbol and a list of import symbols, wherein the main symbol is used to launch the desired process after it has been bound to any import library code fragments that it requires, retrieving all import library code fragments linked to the root code fragment due to the inclusion of a symbol in the library code fragment that corresponds to a symbol in the list of import symbols, determining which patch library code fragments are linked to the retrieved import library code fragments, the patch library code fragment including a patch description data structure including at least one patch which affects a given function utilized by the desired process, binding all import library code fragments that are linked to the root fragment to the root fragment, and statically analyzing the functionality of the at least one patch to predict the result of a call made by the desired process to the given function after the call has been re-directed to the patch.

In an additional embodiment of the present invention, a binding manager for binding a dynamically linked and patched library structure into a desired process is disclosed. The binding manager includes digital processor means and memory means coupled to the digital processor means, fragment retrieving means, fragment handling means, binding means, and patch manager means. The fragment retrieving means executes on the digital processor means and is operable for retrieving root code fragments and import library code fragments stored in the memory means. Furthermore, each of the root code fragments includes root functionality for a desired process, each root code fragment including a main symbol and a list of import symbols. The main symbol is used to launch the desired process after it has been bound to any import library code fragments that it requires and the import library code fragments are linked to the root code fragment due to the inclusion of a symbol in the library code fragment that corresponds to a symbol in the list of import symbols.

The fragment handling means executes on the digital processor means and is operable for determining which patch library code fragments are linked to the retrieved import library code fragments. Still further, the patch library code fragments each include a patch description data structure including at least one patch which affects a given function utilized by the desired process. The binding means is executing on the digital processor and is operable for binding all import library code fragments that are linked to the root fragment to the root fragment. Additionally, the patch manager means is executing on the digital processor an is operable for installing the at least one patch to affect the use of the given function by the desired process such that a call made by the desired process to the given function is re-directed to the patch.

In a further embodiment of the present invention, a static patch analyzer for analyzing a dynamically linked and patched library structure is disclosed. The static patch analyzer includes digital processor means and memory means coupled to the digital processor means, fragment retrieving means, fragment handling means, binding means, and patch analyzer means. The fragment retrieving means executes on the digital processor means and is operable for retrieving root code fragments and import library code fragments stored in the memory means. Furthermore, each of the root code fragments includes root functionality for a desired process, each root code fragment including a main symbol and a list of import symbols. The main symbol is used to launch the desired process after it has been bound to any import library code fragments that it requires and the import library code fragments are linked to the root code fragment due to the inclusion of a symbol in the library code fragment that corresponds to a symbol in the list of import symbols.

The fragment handling means executes on the digital processor means and is operable for determining which patch library code fragments are linked to the retrieved import library code fragments. Still further, the patch library code fragments each include a patch description data structure including at least one patch which affects a given function utilized by the desired process. The binding means is executing on the digital processor and is operable for binding all import library code fragments that are linked to the root fragment to the root fragment. The patch analyzer means is operable for statically analyzing the functionality of the at least one patch to predict the result of a call made by the desired process to the given function after the call has been re-directed to the patch.

BRIEF DESCRIPTION OF THE DRAWINGS

FIG. 4 is a data structure diagram of a transition vector in accordance with one embodiment of the present invention;

FIG. 5 is a diagrammatic illustration of a modern patching paradigm in accordance with one embodiment of the present invention;

BEST MODES FOR CARRYING OUT THE INVENTION

The present invention teaches patches stored in a known format in a discernible location. In the described embodiment, each fragment code may have a corresponding patch library. This enables the patches to be located and analyzed in a quiescent state. In turn, this would allow two different approaches for solving the problems of the prior art. First, the operating system, or a separate utility program, can evaluate and thus, selectively add patches. Therefore, the present invention introduces a patch integrity validation layer into the patching process. Second, by evaluating the patches in a quiescent state, a program or a combination of programs may be exhaustively evaluated prior to execution.

Figure 1:
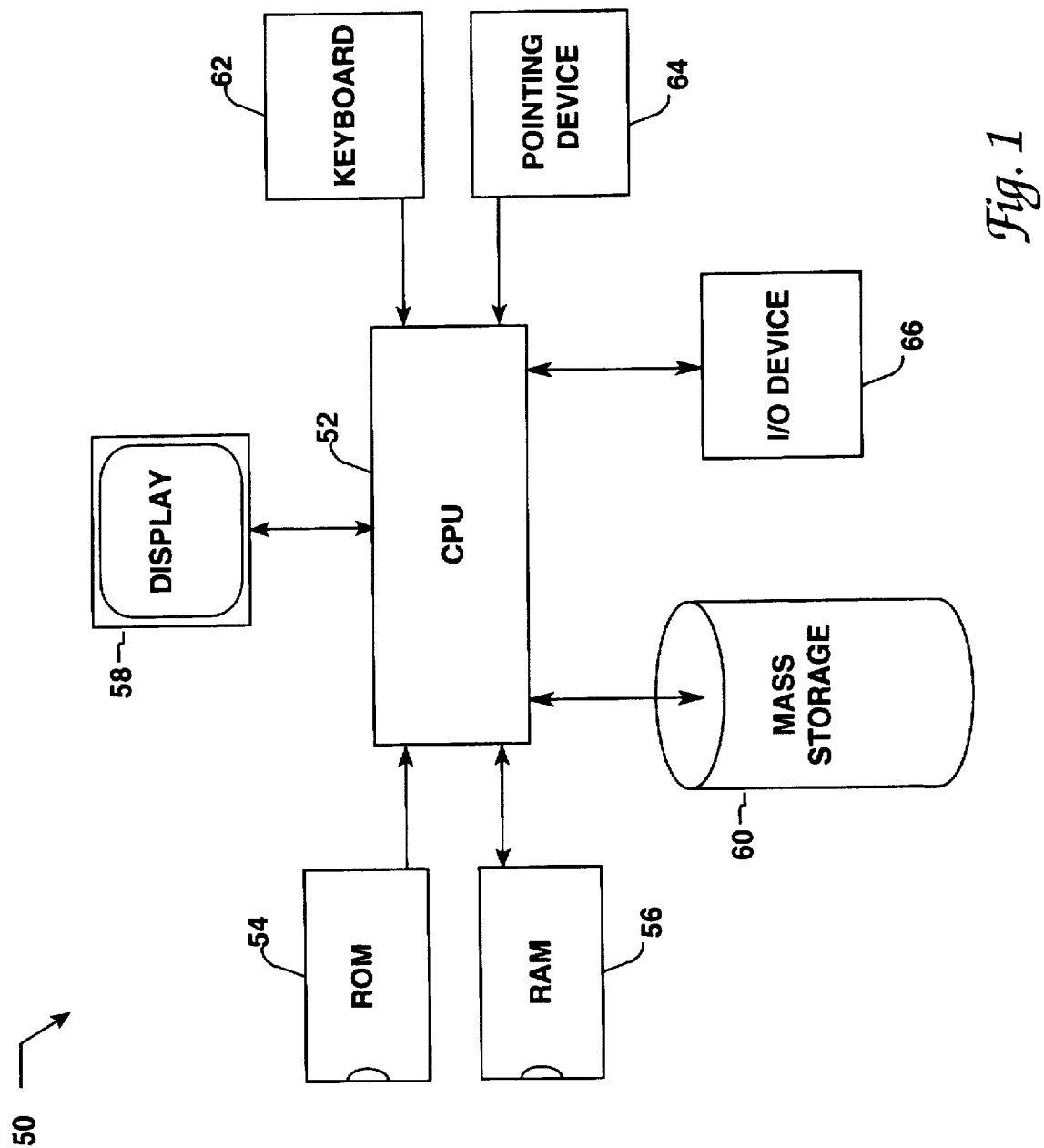
FIG. 1 is a block diagram of a computer system.

In the described embodiments of the present invention, dynamically linked libraries (DLLs), patch code, data closures and executable processes are resident on a computer system which may take any suitable form. By way of example, a representative computer system 50 is illustrated schematically in FIG. 1. The typical computer system 50 includes a central processing unit (CPU) 52 coupled with read only memory (ROM) 54 and to random access memory (RAM) 56. The computer system 50 may optionally include elements such as a display 58, a mass storage device 60, a keyboard 62, a pointing device 64, and an input/output device 66.

As will be appreciated by those skilled in the art, CPU 52 includes a microprocessor and any additional circuitry and/ or device drivers necessary to control the computer system. For instance, the CPU 52 may include a keyboard controller which provides an interface between the microprocessor and the keyboard 62. ROM 64 is typically persistent memory accessible by the CPU 52 which contains the operating system instructions either in an executable format or in a compressed format which is expanded when the computer system 50 boots. RAM 56 is typically transient memory and is used as "scratch pad" memory by the operating system and/or any applications implemented on the computer system 50. For example, if a portion of the operating system present in ROM 64 is in compressed format, it may be expanded and stored into RAM 56.

Devices such as display 58, keyboard 62 and pointing device 64 work together to provide a user interface for the computer system 50. Of course, these three devices are optional as the computer system 50 may perform meaningful work without any of display 58, keyboard 62, and pointing device 64.

Mass storage device 60 is coupled with CPU 52 and may be any mass storage device such as a hard disk system, a floptical disk system, a tape drive or the like. Mass storage device 60 generally includes code fragments such as applications, import libraries, and extensions which are not currently in use by the system. I/O device 66 is coupled to the CPU 52 and may be a network card, a printer port, modem, etc. Additionally there may be a multiplicity of I/O devices such as I/O device 66 coupled to the computer system 50. Design and construction of computer systems such as computer system 50 will be well known to those skilled in the art.

Turning next to FIG. 4, a transition vector (TVector) 400 will be described. In the described embodiments of the present invention, each fragment will typically include a transition vector such as transition vector 400 for each given function found within the fragment's data. The transition vector 400 is a data structure which includes two pointers: a code pointer 402 and a global pointer 404. The code pointer 402 is the address of the given function being called and the global pointer 404 is the address of the called fragment's table of contents. Typically each global pointer 404 found in a fragment has the same value.

With reference to FIG. 5, a modem patching paradigm in accordance with one embodiment of the present invention will be described. The modern patching paradigm includes a dynamically linked library (DLL) application 550 and a patch chain 450. In explanation, the patch chain 450 corresponds to a given function and includes one or more patches which have been linked together. As discussed in the background, patches are intended to modify or replace the functionality of a given function. A call made directly to the given function is re-directed to the patch chain 450 which then proceeds with execution in an orderly fashion.

One suitable embodiment of a patch chain as well as methods for generating a patch chain and inserting patches is described in Lillich et. al.'s U.S. patent application Ser. No. 08/435,360 now issued as U.S. Pat. No. 5,619,698, entitled "METHODS AND APPARATUS FOR PATCHING OPERATING SYSTEMS", assigned to the assignee of the present invention, filed May 5, 1995, and which is incorporated herein by reference in its entirety for all purposes.

The DLL application 550 includes application code 552 and application data 554. In turn, application code 552 will have a call 556 to service glue 558. As discussed in the background, service glue such as service glue 558 provides an indirection across dynamically linked library boundaries. The main function of the service glue is to save memory resources. That is, if the system routine where called more than once, the service glue 558 plus the multiple calls require less memory than duplicating service glue 558 in multiple locations.

The service glue 558 responds to the call 556 and redirects the call using a pointer 560 found in the application data 554 which points to the transition vector (TVector) 400 of the given function 462. In turn, the TVector 400 has been modified to point to the remaining portion 562 of patch chain 450.

Figure 6:
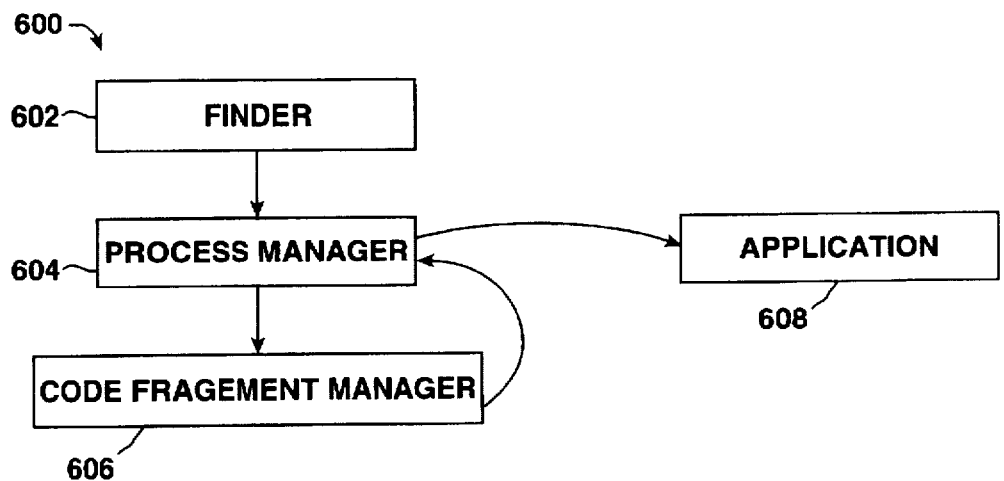
FIG. 6 is a flow diagram illustrating the generation of an executable process in accordance with one aspect of the present invention.

Turning next to FIG. 6, one execution flow 600 for the preparation of an executable process from an application fragment in accordance with the present invention will be described. The described execution flow is especially suitable for an operating system having features similar to the well known Macintosh® Operating System for the PowerPC. For a more detailed description of the Macintosh® Operating System for the PowerPC, see the previously referenced "Inside Macintosh: PowerPC System Software."

FIG. 6 illustrates a Finder 602, a process manager 604, a code fragment manager 606, and an application 608. Although not shown in FIG. 6, at least one collection of DLLs accessible by the code fragment manager 606 is present on the computer system. The application 608 is a process which includes a data closure and an executable process. When fully prepared, the application 608 will include all DLLs brought into its closure to resolve all import symbols present in its closure.

As will be appreciated, the Finder 602 is a primal Macintosh® application which displays the Macintosh desktop and launches other programs at the request of the user. The Finder 602 includes an executable process and data closure which is created from a root fragment containing some root functionality and any required import libraries. The process manager 604 is the component of the operating system which manages creation, scheduling and execution of processes. The process manager 604 includes an executable process and data closure which is created from a root fragment. The code fragment manager 606 serves as the binding manager and, in the Macintosh® operating system, the code fragment manager 606 is a specific DLL present in the process manager 604's data closure.

Figure 2:
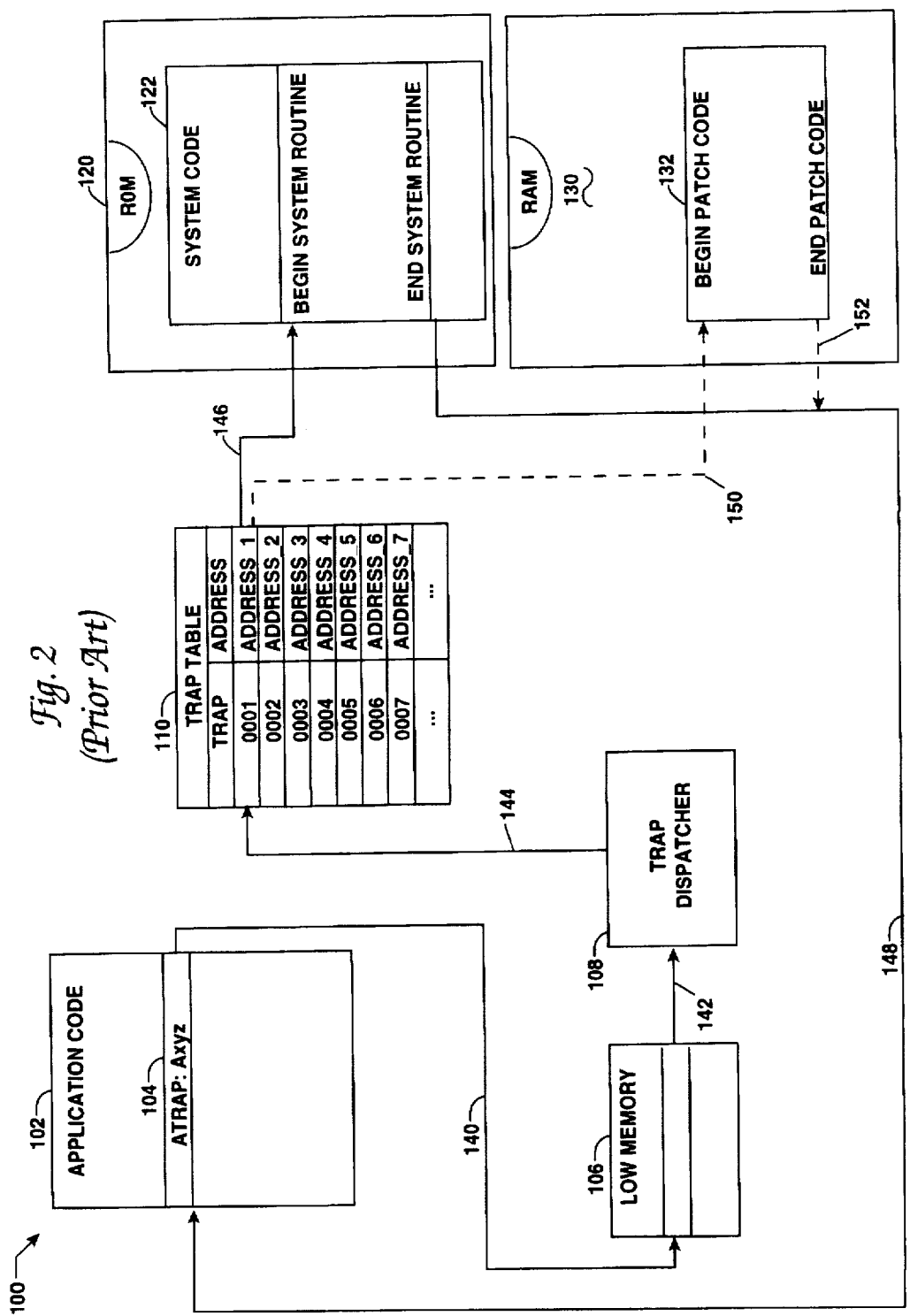
FIG. 2 is a diagrammatic illustration of a 68K patching paradigm of the prior art.
Figure 3:
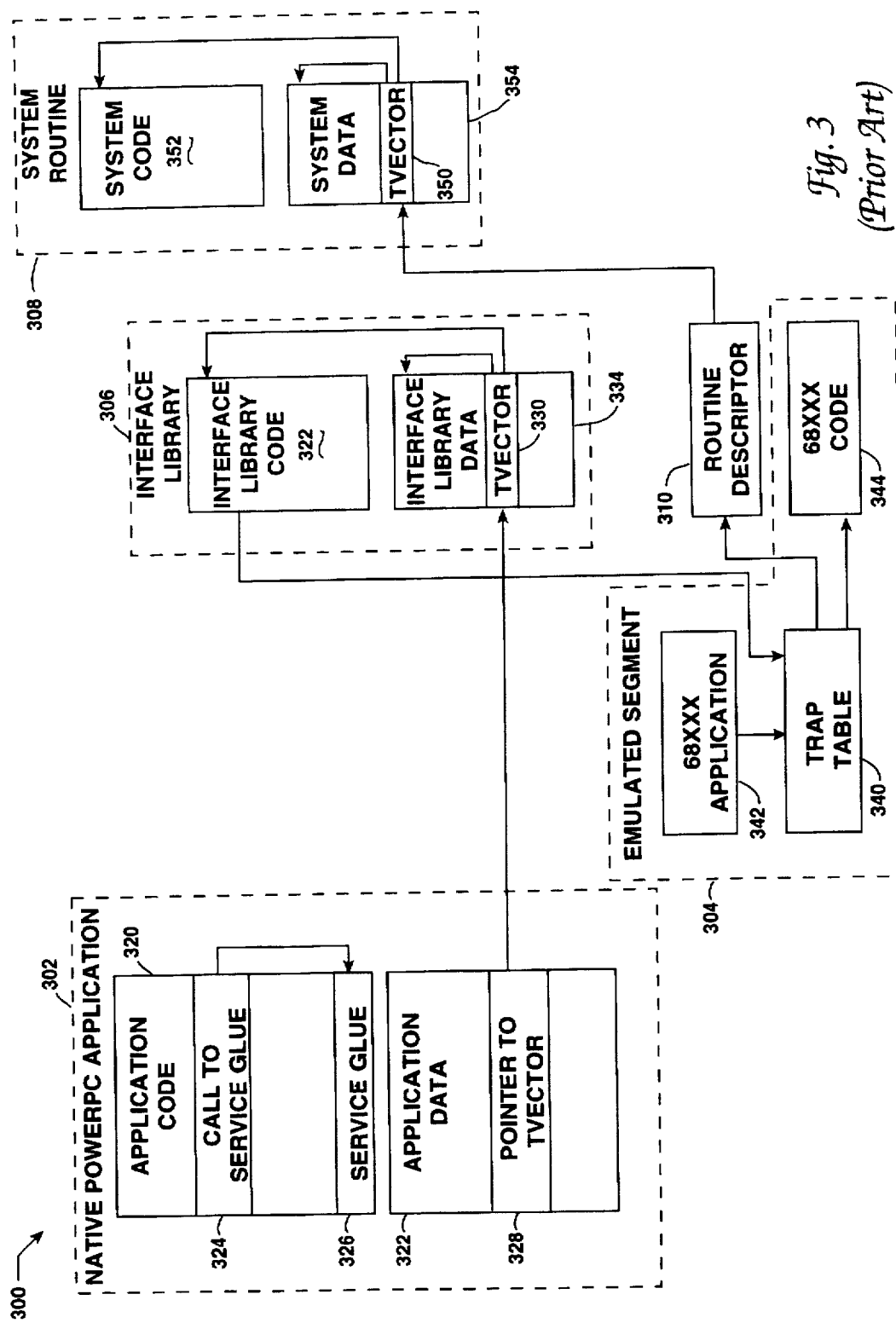
FIG. 3 is a diagrammatic illustration of a PowerPC patching paradigm of the prior art.

In the example of FIG. 2, the Finder 602 and process manager 604 of FIG. 2 are installed and executing in the computer system environment 98. As will be appreciated, this simply corresponds to a normal operating condition on a Macintosh® incorporating a PowerPC processor. The application 608 would then be started as follows. Using the Finder 602, a user selects the application 608 and requests that the application 608 be launched.

As will be appreciated, one method for selecting and launching an application involves the user "selecting" an application icon with a mouse and "double-clicking" on the icon. In the Macintosh® computing environment, an application may be represented on the screen by an icon. Using a mouse (or other pointing device) to position a cursor over the icon and activating the mouse button once will select the application. Rapidly depressing the mouse button twice (i.e. double-clicking) will launch the application. In any event, the Finder 602 calls the process manager 604 to invoke a "prepare fragment" function. In making the call to the process manager 604, the Finder passes some application identifier and other necessary information as parameters to the process manager 604.

In turn, the process manager 604 will ask the code fragment manager 606 to bind the application's root fragment to the new process. In essence, the code fragment manager 606 will then attempt to resolve all import symbols found in the application's root fragment and other DLLs subsequently included in the application closure. Once the DLLs have been added into the closure and the import symbols resolved, the application 608 is ready for execution. If the code fragment manager 606 fails the binding process, this may result in a failure to launch the application 608 and a dialogue box may be displayed providing the user with any relevant information.

Figure 7:
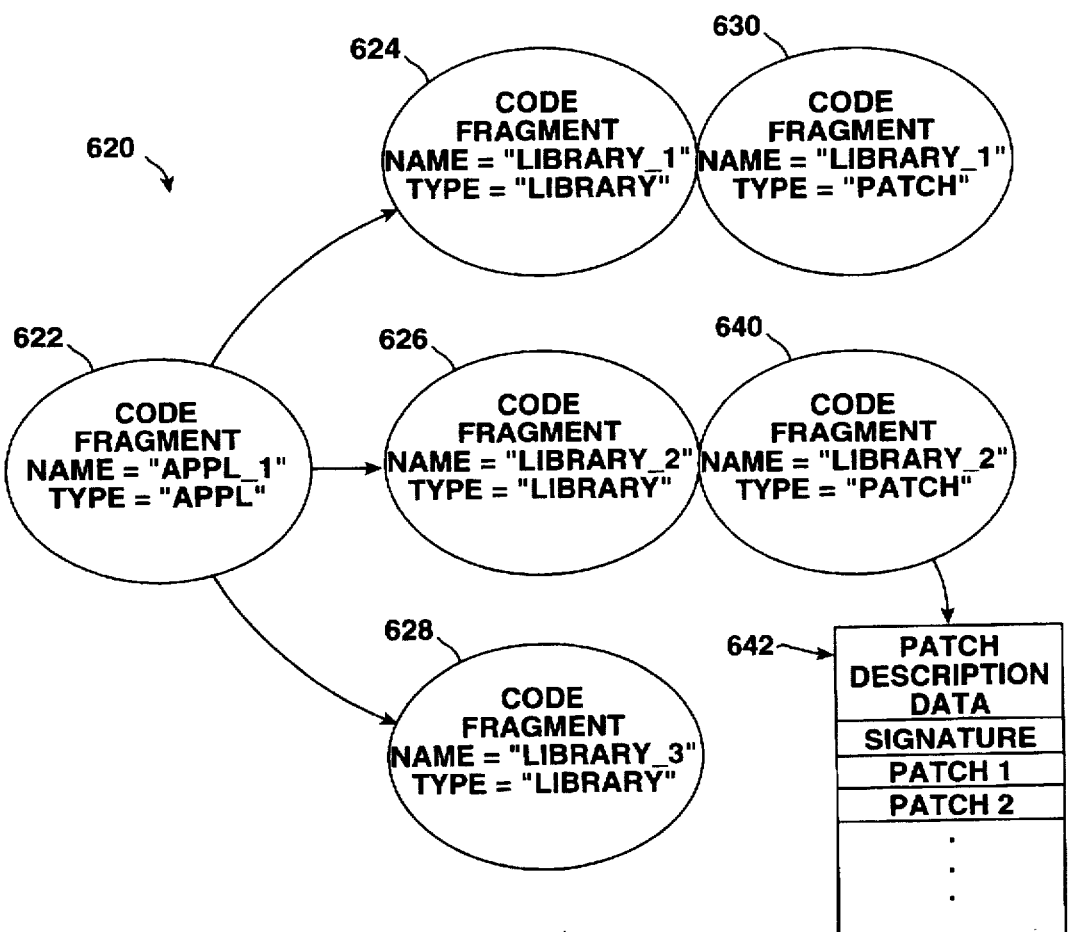
FIG. 7 is a pictorial illustration of an executable process in accordance with one embodiment of the present invention, the executable process including a root fragment, a number of import libraries, and a couple of patch fragments.

Turning next to FIG. 7, one executable process 620 in accordance with one embodiment of the present invention will be described. The process 620 includes a root fragment appl_1 622, import libraries such as library_1 624, library_2 626, library_3 628, and patch libraries such as patch library_1 630 and patch library_2 640. The process 620 may also comprise additional import libraries and patch libraries including those brought into the closure indirectly via symbols listed in import libraries or patch libraries.

The root fragment appl_1 622 includes a root functionality as well as at least one import symbol from each of the import libraries present in process 620. Additionally, root fragment appl_1 622 includes a main symbol which refers to the fragments main routine or root function. Thus, in resolving the import symbols present in appl_1 622, the import libraries library_1 624, library$_{13}$ 2 626, and library_3 628 are brought into the process closure by the binding manager. However, according to the embodiment of FIG. 7, an additional type of fragment, the patch fragment, is introduced into the closure of process 620.

In the embodiment of FIG. 7, the patch fragments are brought into the enclosure by the following strategy. When a specific library is brought into the process 620, the computer system is searched to determine if a corresponding patch library having the same name as the specific library is resident therein. If so, the corresponding patch library is brought into the closure. Note that this search includes patch libraries corresponding to the application. Thus the patches present in the patch library are discernible and can be analyzed and selectively inserted into the process 620. As will be apparent, other strategies which make the patches and/or patch libraries discernible may be utilized to bring patches and/or patch libraries into the closure. For example, a collection of patches may be stored on the computer system, and each patch individually evaluated to determine if the patch belongs in the closure for process 620.

Each patch library such as patch library 640 has a patch description data 642 which is a block of data defining the patches. Patch description data 642 will be described in more detail below with reference to FIG. 8.

Figure 8:
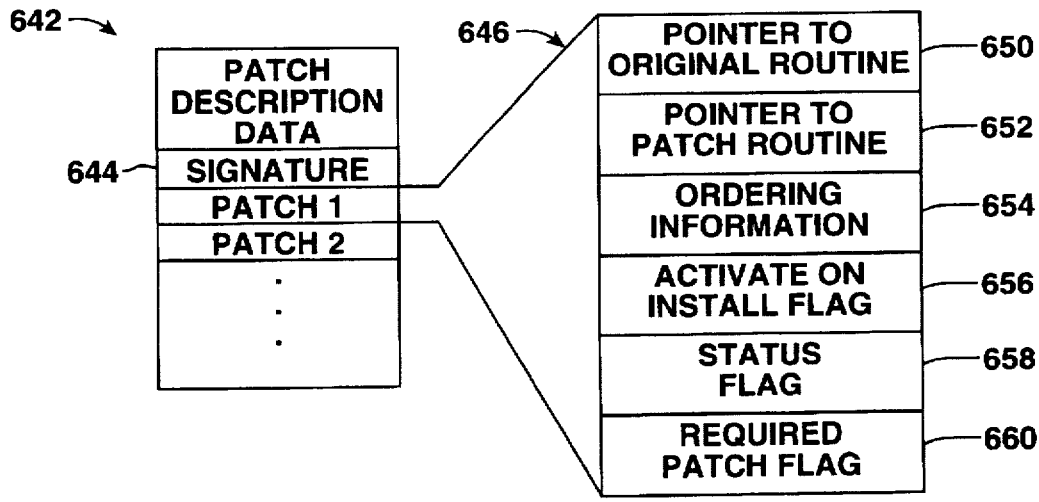
FIG. 8 is data structure diagram of a patch description data block in accordance with another embodiment of the present invention.

Turning the attention to FIG. 8, a patch description data 642 will be described. Patch description data includes a signature 644 and patch descriptors such as patch descriptor patch_1 646. In explanation, the signature 644 is used as a consistency check to verify that this library is a patch library. For example, signature 644 may have a text string "PATCH", "EXTENSION" or "IMPORT" to indicate its type.

The patch descriptor patch_1 646 includes an original routine pointer 650, a patch routine pointer 652, ordering information 654, an activation flag 656, a status flag 658, and a required patch flag 660. As will be apparent, the information stored in a patch descriptor is that information used to install the patch. Accordingly, the patch descriptor may be modified to enable and aid installation in a variety of computing environments with various patching paradigms.

In further explanation of the descriptor patch_1 646, the original routine pointer 650 contains the address of the given function which this particular patch is intended to modify or replace, while the patch routine pointer 652 contains the address of this particular patch.

Ordering information 654 includes a name for this particular patch and information such as requests and/or constraints which apply to this particular patch. For instance, this particular patch may request to be at the beginning of the patch chain for the given function. In another instance, this particular patch may require that it be located immediately after some other named patch.

The activate on install flag 656 indicates whether the patch is enabled when it is installed in the patch chain. By way of example, this particular patch may wait for another entity to enable it. The status flag 658 is used to indicate whether this particular patch was successfully installed. The required patch flag 660 is indicative of whether installation of this particular patch is required for successful operation. If a patch is optional, installation may fail without aborting the entire loading process as is further be described below with respect to step 882 of FIG. 12.

Figure 9:
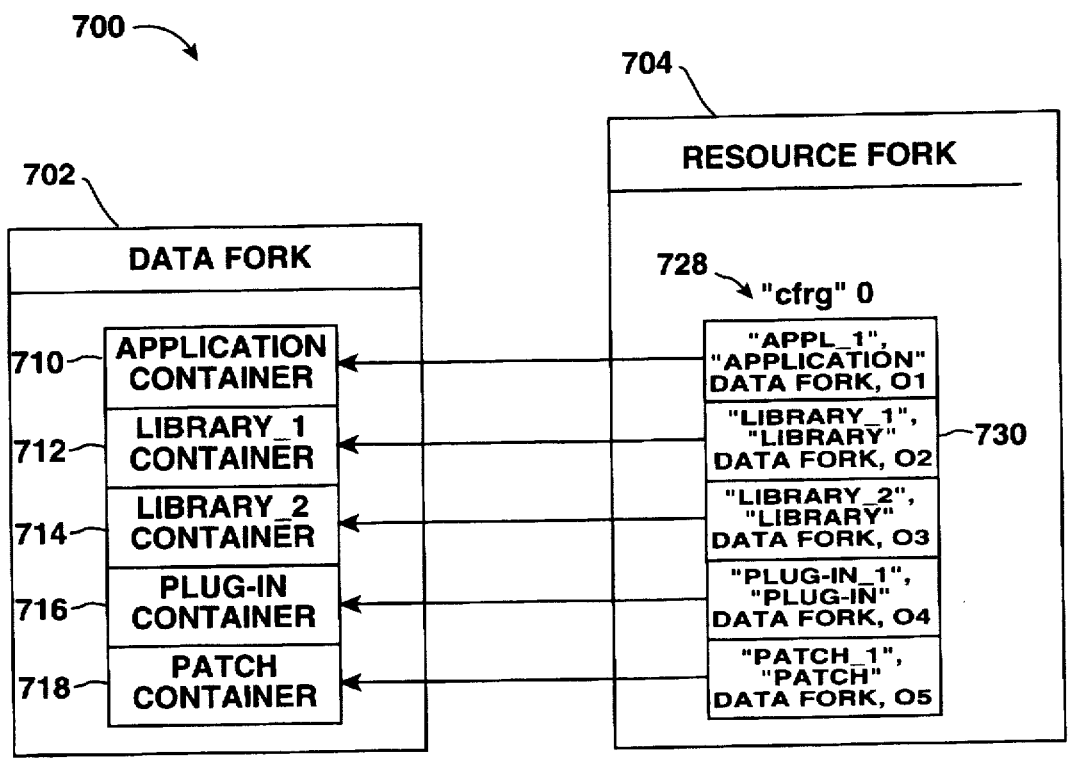
FIG. 9 is a diagrammatic illustration of the structure of an application within a dynamically linked operating system architecture.

Turning now to FIG. 9, the structure of a PowerPC application 700 will be described. The PowerPC application 700 includes a data fork 702 and a resource fork 704. As will be well familiar to those skilled in the art, the data fork 702 includes a number of containers such as application container 710, library_1 container 712, library_2 container 714, plug-in container 716, and patch container 718. In explanation, a container, the main storage for a fragment, is typically a contiguous block of storage that holds components of a fragment and information describing the location of the elements of the fragment and the format of the container.

The resource fork 704 includes blocks of storage identified by a name and numeric ID, with all blocks of a given name having the same format. In particular, the block 728 of name "cfrg" and ID zero is used to identify and locate the code fragments stored within the given file. Each fragment is identified by its name, its usage, and its location. For example, one fragment identifier 730 includes a name "Library_1", a usage "library", and its location "data fork, O2" wherein O2 corresponds to an offset within the data fork 702. For a more detailed description of the structure of a PowerPC application, see the previously referenced "Inside Macintosh: PowerPC System Software"© 1994 Apple Computer, Inc.

Figure 10:
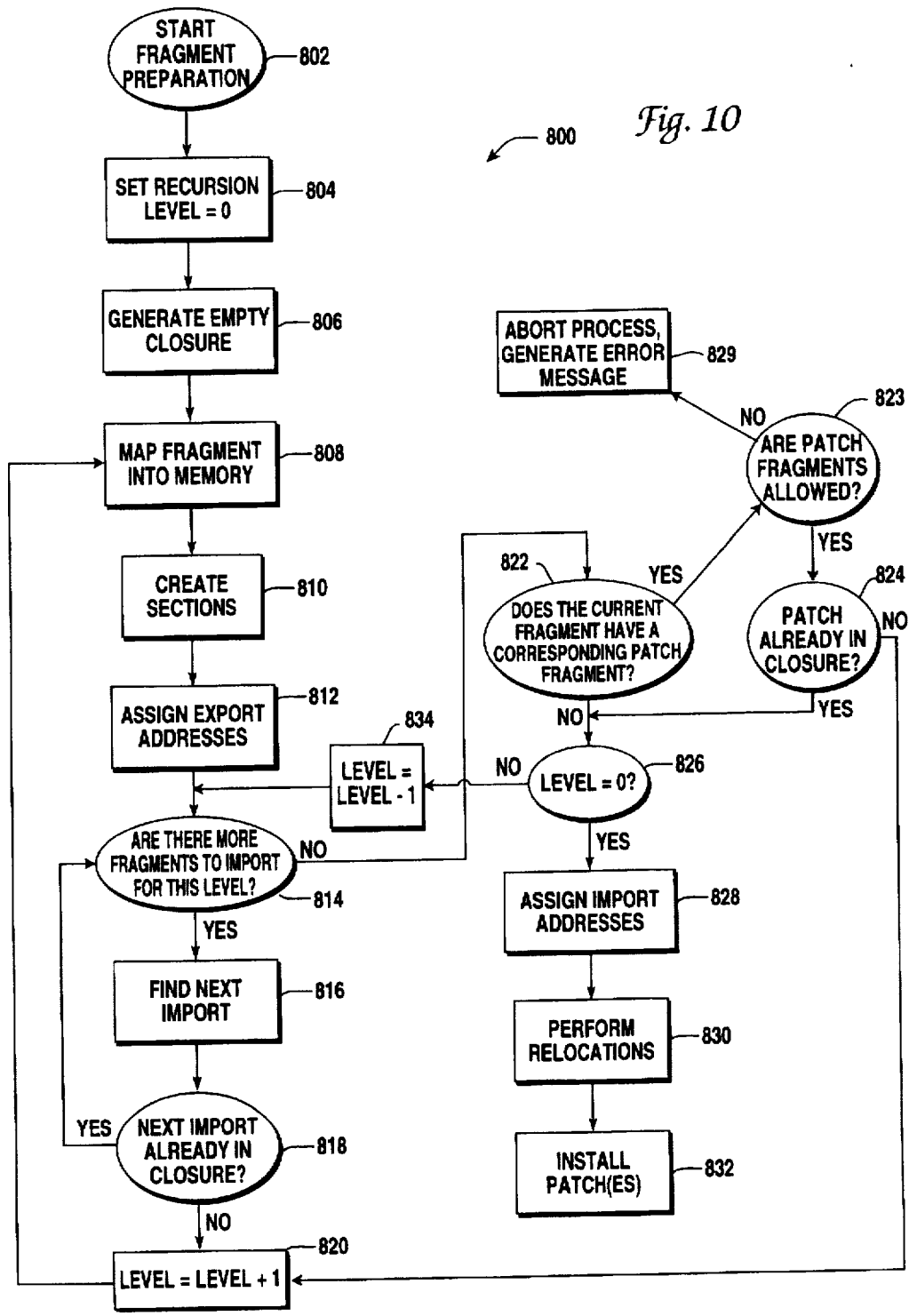
FIG. 10 is a flow chart illustrating one method for generating an executable process in accordance with the present invention, the method capable of including patch libraries into the data closure of the executable process.

With reference to FIG. 10, one method 800 for preparing a fragment for execution will now be described. In step 802 fragment preparation is initiated. In the prior art, fragment preparation is concerned mainly with resolving any import symbols in the root fragment (or any subsequently introduced fragments) which reference code or data exported by other fragments. Since there may be multiple layers of fragments which contain symbols, each layer must be resolved. As will be appreciated, a variety of suitable methods for resolving the different layers exist. The method 800 utilizes a recursive method. Thus, in an initial step 804 a variable called recursion level is set to zero. Then, in step 806, an empty data closure is created. Closure creation step 806 includes allocating memory and generating any data structures which may be used in the executable process created by method 800.

A next step 808 performs the task of mapping the current fragment into memory. Step 808 generates a fragment container such as shown in FIG. 9 available in memory. This makes the fragment code available for later execution and makes the compacted data and symbol tables (list of export and import symbols) available to the binding manager. In explanation, a fragment is typically stored such that the code portion is in executable format while the data portion is in compressed format. This is done because the code portion can be utilized by multiple processes, but the data must be uniquely generated for each instance of the fragment.

On the first execution of step 808, the root fragment is the current fragment mapped into memory. However, on subsequent executions of step 808, the additional fragments which are added into the data closure must also be mapped into memory, therefore the method 800 will loop back into step 808 for processing of different recursion levels.

A next step 810 creates sections for the current fragment within the data closure. This includes substeps such as determining the memory address of the mapped code, creating memory space for the data, decompressing the data, and determining the memory address for the data. Then in step 812 the export addresses are assigned. In explanation, a symbol table in a container records an exported symbol by name, section (either code or data), and an offset within the section. Since step 810 determined the addresses of the sections, step 812 can now determine the memory address for symbols exported by this fragment.

A next step 814 determines if there are more fragments to import at the current recursion level. If there are import symbols left unresolved (i.e., there are necessary fragments which have not been brought into the data closure), then a step 816 finds the next import library. Then a step 818 determines if the next import found in step 816 is already in the data closure. As will be apparent, the next fragment selected in step 816 may well have been brought into the data closure by way of another fragment in either this or another recursion level. If so, control loops back on the YES branch of step 818 to step 814 where it is again determined if there are more fragments to import.

If, however, step 818 determines that the next import found in step 816 is not in the data closure, a step 820 increments the recursion level by unity and control loops back to step 808, where the next import fragment is mapped into memory and the appropriate subsequent steps are performed for the new recursion level.

Turning next to the NO branch of step 814, if there are no more fragments to import at the current level, a step 822 determines if the current fragment has an associated patch fragment. As will be appreciated further after the discussion of the subsequent steps of FIG. 10, according to the method 800, within each recursion level the import library is brought into the data enclosure first. Then, as seen in step 822, it is determined if the current fragment has an associated patch library such as patch library 640.

If there are patches, then a step 823 determines whether patch fragments are allowed in the closure. For example, patch fragments would not be allowed if the closure being generated was for what is termed in the art a "plug-in." However, if the closure was for an application, patching would be allowed. Therefore, if patching is not allowed, a step 829 aborts method 800 and generates an error message.

If, however, patching is allowed, then a step 824 determines if the patch library is already in the data closure. If the patch library is not in the data closure, then step 820 increments the recursion level by unity and control loops back co step 808, where the patch library fragment is mapped into memory and the appropriate subsequent steps are performed for the new recursion level.

If step 822 determines that the current fragment does not have an associated patch library, then control passes to step 826 which determines if the recursion level is zero: the initial recursion level. If the recursion level is not zero, then a step 834 decrements the recursion level by unity, thereby backing down a recursion level. Once the recursion level has been decremented, control is passed back to step 814 which determines if there are more fragments to import at this level, and, based on the outcome of step 814, the appropriate subsequent steps are performed.

Turning to the YES branch of step 826, if the initial recursion level has been reached (i.e. recursion level equals zero), then the method 800 continues on in step 828 by assigning all import addresses. In explanation, at this point, step 828 in method 800, all the addresses for the import symbols can be determined since the import libraries have been mapped to known addresses within the data closure. Thus, all the import symbols may be resolved. Accordingly, a next step 830 performs the necessary relocation including writing the addresses of import symbols in table of contents and writing the proper code and data addresses in the appropriate TVectors.

Finally, a step 832 installs all the patches found in the previous steps. As will be appreciated, there are a variety of suitable methods for installing patches, the appropriate method being chosen based upon the specific details of the operating system as well as other factors. One suitable embodiment of step 832 is described in more detail below with respect to FIG. 12.

Figure 11:
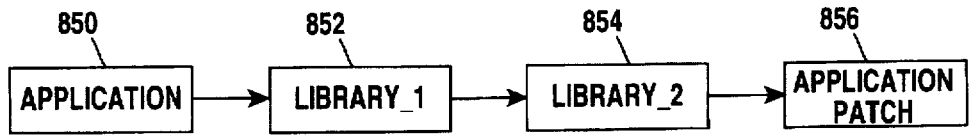
FIG. 11 is a data diagram for use in illustrating the generation of an executable process having a root fragment, a couple of import libraries, and at least one patch library.

FIG. 11 illustrates a data diagram which will be used to describe the flow of a few fragments being brought into a data enclosure according to the method 800 of FIG. 10. Note that any steps referred to by reference numbers not shown in FIG. 11 are described above with reference to FIG. 10. FIG. 11 shows a root fragment termed application fragment 850, two import library fragments library__1 852 and library__2 854, and a patch library fragment termed application patch 856.

Initially, the root fragment application 850 is brought into a new data closure and preparation of the application 850 is begun. This corresponds to steps 802–812 where the recursion level is zero. Then, analogous to steps 814–820, it is determined both that (a) import symbols from library__1 852 are present in application 850 and (b) library__1 852 is not yet in the data closure. Therefore, library__1 852 must be brought into the closure and the recursion level incremented by one, bringing the recursion level to unity. Accordingly, analogous to steps 808–812, library__1 852 is brought into the data closure.

Once library__1 is brought into the data closure, it is determined (analogous to steps 814–818) that both (a) import symbols from library__2 854 are present in library__1 852 and (b) library__2 854 is not in the closure. Therefore, analogous to steps 820 and 808–812, the recursion level is incremented by one (bringing the recursion level to two) and library__2 854 is brought into the closure.

Once library__2 854 is brought into the data closure, it is determined that it is not necessary to bring any more import libraries into the data closure. Note that this could occur through any of three scenarios. In the first scenario, library__2 854 simply doesn't have any import symbols. In the second scenario, library__2 does include import symbols, but the corresponding import libraries have been brought into the closure through other libraries which have already been processed. In the third scenario, library__2 854 does include import symbols requiring import libraries not brought into the closure by other fragments. However, in the third scenario, the method of FIG. 10 guarantees that all the import libraries required by library__2 854 will be brought into the data closure. This will be done by recursively adding the required import libraries as discussed above with reference to FIG. 10.

In any event, after all the import libraries required for library__2 854 have been brought into the closure, it is determined (analogous to steps 822 and 824) that application patch 856 is required and is not yet in the data closure. In some embodiments, the patch description data which indicated application patch 856 is found by being labeled with a predefined export name, one that corresponds to library_2 854. In any case, the recursion level is again incremented by unity bringing it to level three, and the patch library application patch 856 is brought into the closure. Note that bringing application patch 856 into the closure involves checking the import symbols in the patches and subsequently bringing any necessary import libraries and patch libraries into the closure.

Figure 12:
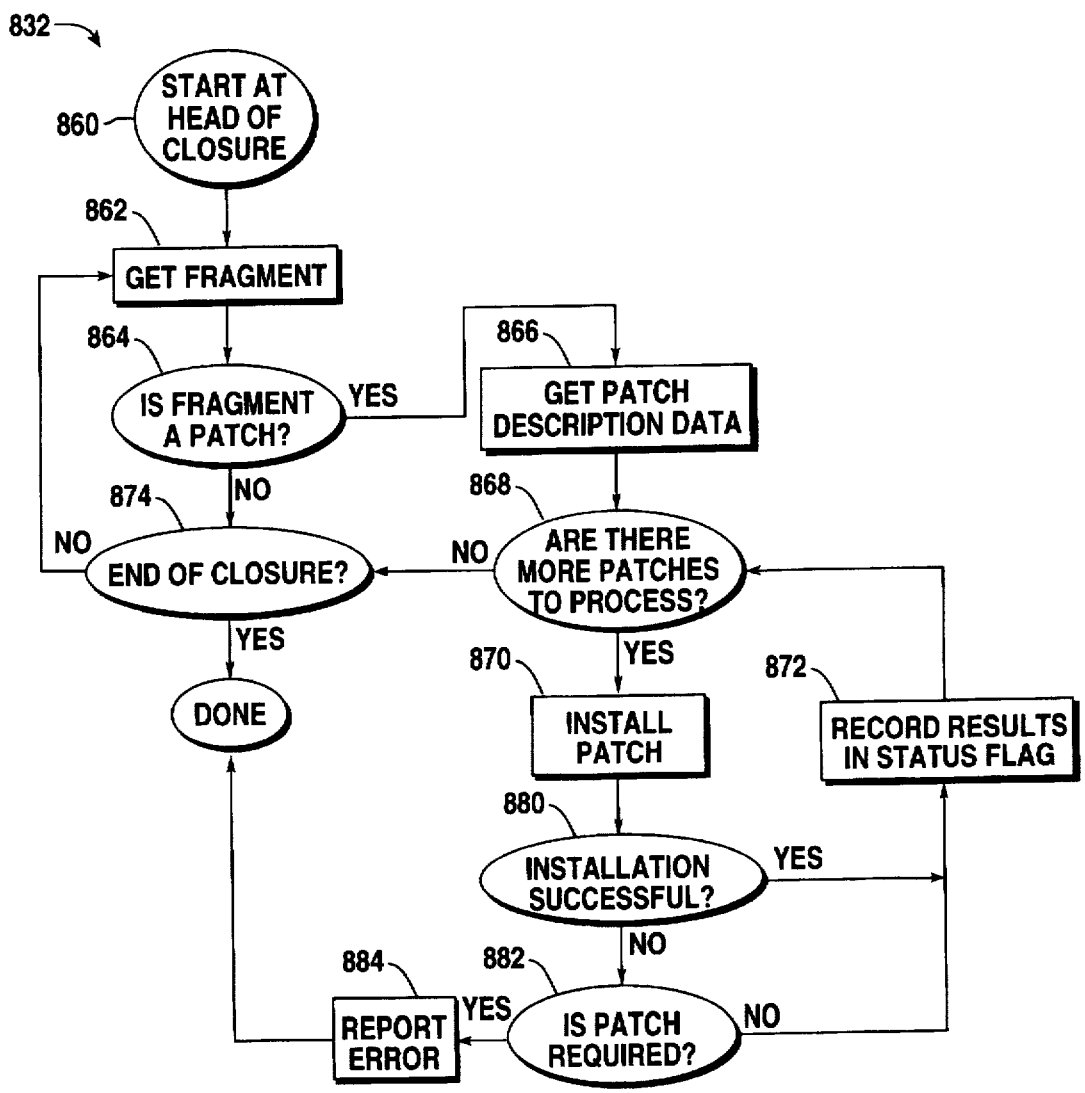
FIG. 12 is a flow chart illustrating a more detailed method for performing step 832 of FIG. 10 in accordance with another aspect of the present invention.

With reference to FIG. 12, a method for performing patch installation step 832 of FIG. 10 in accordance with one aspect of the present invention will be described. The method 832 begins in step 860 at the head of the data closure created in steps 806 826 of FIG. 10. The data closure includes the root fragment, any required import libraries, and any required patch fragments. Step 862 will select a fragment from the closure which has not yet been processed. Once an unprocessed fragment has been selected, a step 864 determines if the fragment is a patch library. If the selected fragment is not a patch, then a step 874 determines if the end of the closure has been reached (i.e. have all fragments in the closure been processed).

If, however, the selected fragment is a patch library, then a step 866 retrieves the patch data from the patch library. As described with respect to FIGS. 7 and 8, the patch data has a collection of patch information such as addressing, ordering information, and activation information required for each patch listed in the patch data. A next step 868 determines if there are more patches in the selected patch library. On the first pass through step 868 for the selected patch library, step 868 simply determines if the selected patch library has patches, or if it is simply a null set. However, on subsequent executions of step 868, the patches of the selected patch library are evaluated to determine if they have been processed. If there are no more patches to process, then control proceeds in the end of closure determination step 874.

Once it is determined in step 868 that there are more patches to process, a next patch is selected and a patch manager is requested to install the next patch in a step 870. By way of explanation, a patch manager is the service executing on the computer system which serves to install patches to augment the appropriate function. One suitable patch manager is described in previously referenced Lillich et. al.'s U.S. patent application Ser. No. 08/435,360, now issued as U.S. Pat. No. 5,619,698 entitled "METHODS AND APPARATUS FOR PATCHING OPERATING SYSTEMS".

After the next patch from the selected patch library has been installed in step 870, a step 880 determines if installation step 870 was successful. If so, a step 872 records the status results of the patch installation into the status flag found in the patch data. Then control is passed back to step 868 where it is determined if there are more patches to process, and, depending upon the determination, appropriate steps are taken.

If step 880 determines that the patch was not successfully installed, then step 882 determines if the current patch was a required patch by evaluating its required patch flag 660. If so, step 884 reports an error an step 832 is aborted. However, if the patch was an optional patch, control is given to step 872 where the patch failure is reported but the method of step 832 continues processing.

Figure 13:
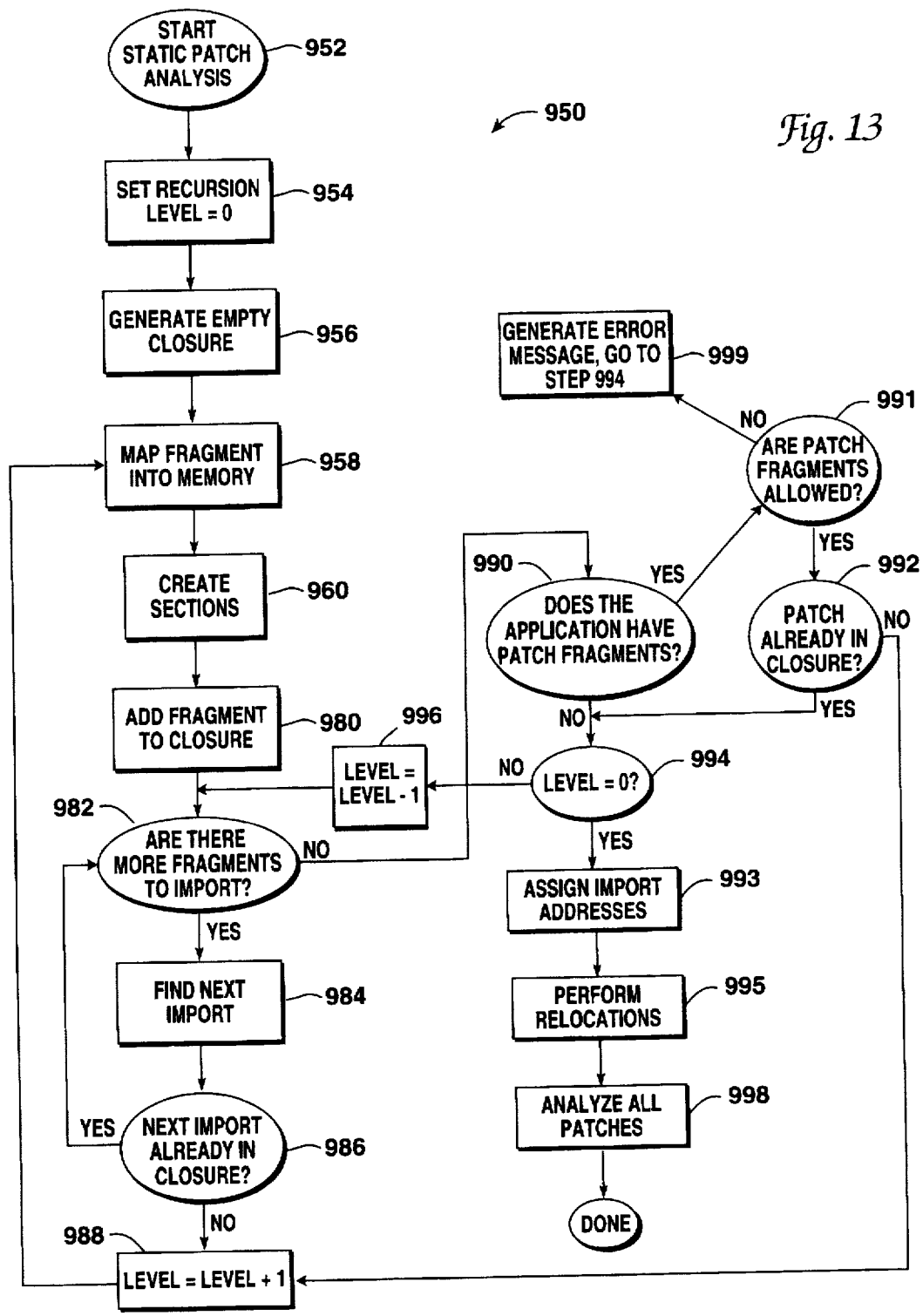
FIG. 13 is a flow chart illustrating one method for performing a static analysis of a fragment capable of having patch fragments in accordance with yet another aspect of the present invention.

With reference to FIG. 13, one method 900 for performing a static analysis of the patches of an application is performed. In step 952 fragment preparation is initiated. In the prior art, fragment preparation is concerned mainly with resolving any import symbols in the root fragment (or any subsequently introduced fragments) which reference code or data exported by other fragments. Since there may be multiple layers of fragments which contain symbols, each layer must be resolved. As will be appreciated, a variety of suitable methods for resolving the different layers exist. The method 900 utilizes a recursive method. Thus, in an initial step 954 a variable called recursion level is set to zero. Then, in step 956, an empty data closure is created. Closure creation step 956 includes allocating memory and generating any data structures which may be used for analysis by method 900.

A next step 958 performs the task of mapping the current fragment into memory. Step 958 creates a fragment container such as shown in FIG. 9 available in memory. This makes the fragment code available for later evaluation and makes the compacted data and symbol tables (list of export and import symbols) available to the binding manager. In explanation, a fragment is typically stored such that the code portion is in executable format while the data portion is in compressed format. This is done because the code portion can be utilized by multiple processes, but the data must be uniquely generated for each instance of the fragment.

On the first execution of step 958, the root fragment is the current fragment mapped into memory. However, on subsequent executions of step 958, the additional fragments which are added into the data closure must also be mapped into memory, therefore the method 950 will loop back into step 958 for processing of different recursion levels.

A next step 960 creates sections for the current fragment within the data closure. This includes substeps such as determining the memory address of the mapped code, creating memory space for the data, decompressing the data, and determining the memory addressing for the data. Then in step 980 the export addresses are assigned. In explanation, a symbol table in a container records an exported symbol by name, section (either code or data), and an offset within the section. Since step 960 determined the addresses of the sections, step 980 can now determine the memory addressing for symbols exported by this fragment.

A next step 982 determines if there are more fragments to import at the current recursion level. If there are import symbols left unresolved (i.e., there are necessary fragments which have not been brought into the data closure), then a step 984 finds the next import library. Then a step 986 determines if the next import found in step 984 is already in the data closure. As will be apparent, the next fragment selected in step 984 may well have been brought into the data closure by way of another fragment in either this or another recursion level. If so, control loops back on the YES branch of step 986 to step 982 where it is again determined if there are more fragments to import.

If, however, step 986 determines that the next import found in step 984 is not in the data closure, a step 988 increments the recursion level by unity and control loops back to step 958, where the next import fragment is mapped into memory and the appropriate subsequent steps are performed for the new recursion level.

Turning next to the NO branch of step 982, if there are no more fragments to import at the current level, a step 990 determines if the current fragment has an associated patch fragment. As will be appreciated further after the discussion of the subsequent steps of FIG. 13, according to the method 950, within each recursion level the import library is brought into the data enclosure first. Then, as seen in step 990, it is determined if the current fragment has an associated patch library such as patch library 640.

If there are patches, then a step 991 determines whether patch fragments are allowed in the closure. For example, patch fragments would not be allowed if the closure being generated was for an plug-in fragment. However, if the closure was for an application, patching would be allowed. Therefore, if patching is not allowed, a step 999 generates an error message and passes control to a step 994.

If, however, patching is allowed, then a step 992 determines if the patch library is already in the data closure. If the patch library is not in the data closure, then step 988 increments the recursion level by unity and control loops back to step 958, where the patch library fragment is mapped into memory and the appropriate subsequent steps are performed for the new recursion level.

If step 990 determines that the current fragment does not have an associated patch library, then control passes to step 994 which determines if the recursion level is zero: the initial recursion level. If the recursion level is not zero, then a step 996 decrements the recursion level by unity, thereby backing down a recursion level. Once the recursion level has been decremented, control is passed back to step 982 which determines if there are more fragments to import at this level, and, based on the outcome of step 982, the appropriate subsequent steps are performed.

Turning to the YES branch of step 994, if the initial recursion level has been reached (i.e. recursion level equals zero), then the method 950 continues on in step 993 by assigning all import addresses. In explanation, at this point, step 993 in method 950, all the addresses for the import symbols can be determined since the import libraries have been mapped to known addresses within the data closure. Thus, all the import symbols may be resolved. Accordingly, a next step 995 performs the necessary relocation including writing the addresses of import symbols in table of contents and writing the proper code and data addresses in the appropriate TVectors.

After the recursive portion of method 950 is finished, the process continues on in step 998 by analyzing all patches. A more detailed description of step 998 is described immediately below with respect to FIG. 14.

Figure 14:
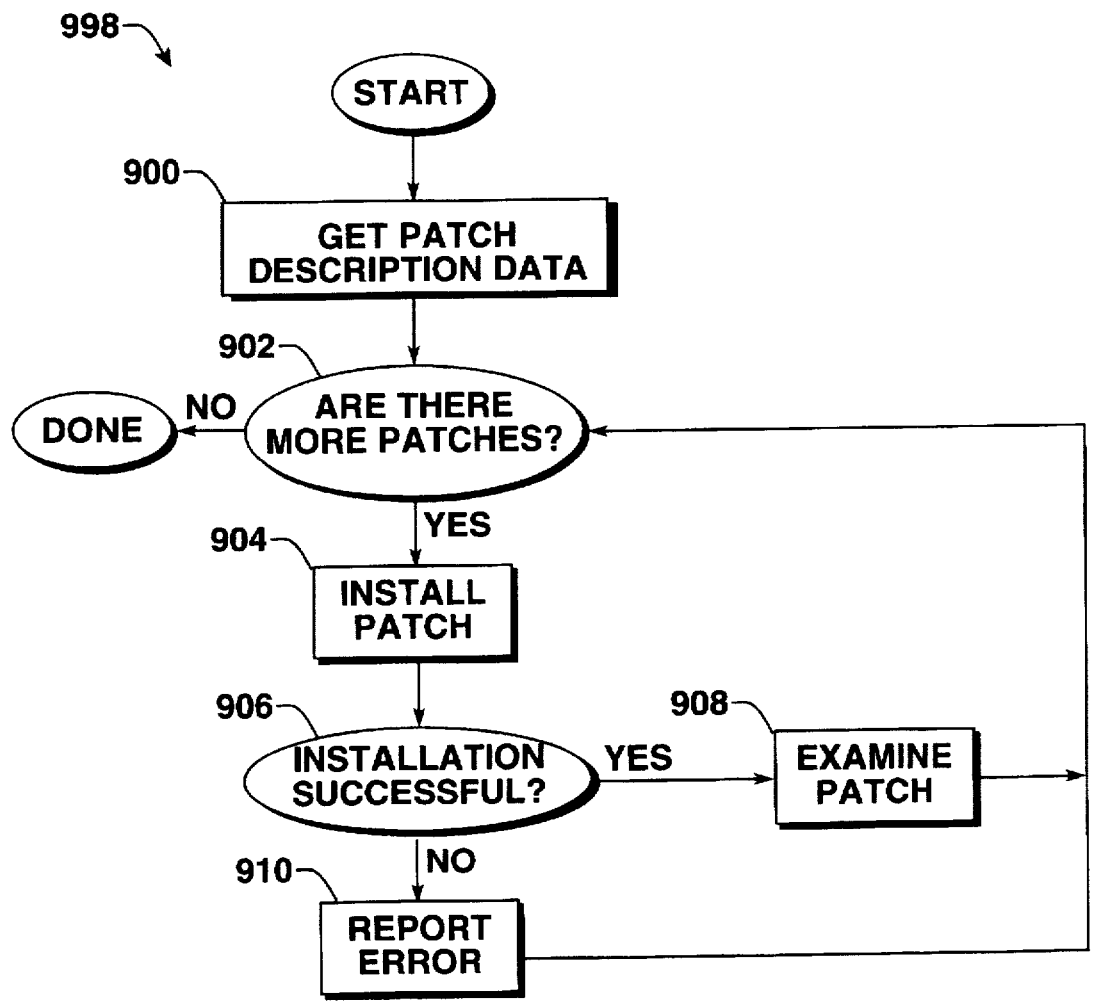
FIG. 14 is a flow chart illustrating one method for performing an analyze patches step 998 of FIG. 13 in accordance with another aspect of the present invention.

With the attention directed at FIG. 14, a method for performing analysis step 998 of FIG. 13 is described. A first step 900 will retrieve all the patch description data. Then a step 902 will determine if there are patches remaining to be processed. If so, than a step 904 installs the current patch. Then a step 906 determines if the current patch installation was successful. If not, an error is reported.

If current patch installation was successful in step 904, a step 908 will examine the patch. Examine patch step 908 may perform a variety of operations such as reporting data on patch installations (i.e. what patches and in which positions), reporting data on which original routines are patched, how many patches, etc., and looking for known patterns of problems (e.g. patches that are known via experience to be incompatible but don't set their own ordering constraints properly). Additionally, an analysis report may be generated providing a complete analysis of the entire closure.

While this invention has been described in terms of several preferred embodiments, there are alterations, permutations, and equivalents which fall within the scope of this invention. It should also be noted that there are many ways of implementing both the methods, apparatus, and structures of the present invention. It is therefore intended that the following appended claims be interpreted as including all such alterations, permutations, and equivalents as fall within the true spirit and scope of the present invention.

What is claimed is:

1. A computer implemented process intended to execute within a dynamically linked computing environment, the dynamically linked computing environment capable of supporting a plurality of computer implemented processes, the dynamically linked computing environment providing a given function available for use by said plurality of computer implemented processes, the computer implemented process having a dynamically linked and patched library structure comprising:

a root code fragment including root functionality for said computer implemented process, said computer implemented process using said given function, said root code fragment including a main symbol and at least one import symbol, wherein said main symbol is used to launch said computer implemented process after it has been bound to any import library code fragments that it requires;

an import library code fragment linked to said root code fragment by said at least one library import symbol, such that said import library code fragment can be bound to said root code fragment prior to said launch of said computer implemented process; and a patch library code fragment stored in a predefined format such that the patch library code fragment is discernible when the computer implemented process is in a quiescent state, the patch library code fragment including a patch description data structure having at least one patch descriptor which indicates a patch which is intended to affect said given function utilized by said computer implemented process, wherein the presence of said patch library code fragment in said dynamically linked and patched library structure is operable to affect a functionality of said given function only with respect to said computer implemented process.

2. A computer implemented process as recited in claim 1 wherein said patch library code fragment and said import library code fragment are connected by a link mechanism, said link mechanism arranged to enable inclusion of said patch library code fragment within said process.

3. A computer implemented process as recited in claim 2 wherein said import library code fragment and said patch library code fragment each include an identical name descriptor, said identical name descriptor serving as said link mechanism.

4. A computer implemented process as recited in claim 3 wherein said import library code fragment further includes a type import library descriptor and said patch library code fragment further includes a type patch library descriptor, whereby said import library code fragment and said patch library code fragment are readably distinguished.

5. A computer implemented process as recited in claim 1 wherein said root code fragment and said import library code fragment are connected by a link mechanism, said link mechanism arranged to enable inclusion of said patch library code fragment within said process.

6. A computer implemented process as recited in claim 5 wherein said root code fragment and said patch library code fragment each include an identical name descriptor, said identical name descriptor serving as said link mechanism.

7. A computer implemented process as recited in claim 6 wherein said import library code fragment further includes a type application descriptor and said patch library code fragment includes a type patch library descriptor, whereby said root code fragment and said patch library code fragment are readably distinguished.

8. A computer implemented process as recited in claim 1 wherein said computer implemented process is resident on a computer system and said patch library code fragment is arranged to be included in every process implemented on said computer system.

9. A computer implemented process as recited in claim 1 wherein said computer implemented process is resident on a computer system and said patch library code fragment is arranged to be selectively included in any process implemented on said computer system.

10. A computer implemented process as recited in claim 1 wherein said patch description data structure further includes a signature element, said signature element indicating that said patch library code fragment is a patch type library, said signature element for use in a consistency check which verifies the type of said patch library code fragment.

11. A computer implemented process as recited in claim 1 wherein said at least one patch descriptor includes an original routine pointer pointing to said given function.

12. A computer implemented process as recited in claim 1 wherein said at least one patch descriptor includes a patch routine pointer pointing to said patch.

13. A computer implemented process as recited in claim 1 wherein said at least one patch descriptor includes ordering information, said ordering information arranged to indicate an insertion point for said patch within a patch chain for said given function, said patch chain intended to affect said given function.

14. A computer implemented process as recited in claim 1 wherein said at least one patch descriptor includes an activate on install flag, said activate on install flag arranged to indicate whether said patch is to affect said given function immediately after installation or if said patch is to remain quiescent after installation.

15. A computer implemented process as recited in claim 1 wherein said at least one patch descriptor includes a status flag arranged to indicate if said patch was successfully installed.

16. A computer implemented process as recited in claim 1 wherein said at least one patch descriptor comprises:
an original routine pointer pointing to said given function;
a patch routine pointer pointing to said patch;
ordering information arranged to indicate an insertion point for said patch within a patch chain for said given function, said patch chain intended to affect said given function;
an activate on install flag, said activate on install flag arranged to indicate whether said patch is to affect said given function immediately after installation or if said patch is to remain quiescent after installation; and
a status flag arranged to indicate if said patch was successfully installed.

17. A computer system comprising:
a central processing unit;
memory coupled to said central processing unit; and
a process as recited in claim 1, said process resident in said memory and executing on said central processing unit.

18. A method for binding a computer implemented process in preparation for execution within a dynamically linked computing environment, the dynamically linked computing environment capable of supporting a plurality of computer implemented processes, the dynamically linked computing environment providing a given function available for use by said plurality of computer implemented processes, the computer implemented process having a dynamically linked and patched library structure, the method comprising the steps of:
retrieving a root code fragment including root functionality for said computer implemented process, said computer implemented process using said given function, said root code fragment including a main symbol and a list of import symbols, wherein said main symbol is used to launch said computer implemented process after it has been bound to any import library code fragments that it requires;
retrieving all import library code fragments linked to said root code fragment due to the inclusion of a symbol in said library code fragment that corresponds to a symbol in said list of import symbols;
determining which patch library code fragments are linked to said retrieved import library code fragments, each of said patch library code fragments including a patch description data structure having at least one patch which affects said given function utilized by said computer implemented process;
binding all import library code fragments that are linked to said root fragment to said root fragment; and
installing said at least one patch to affect the use of said given function by said computer implemented process such that a call made by said computer implemented process to said given function is re-directed to said patch,
wherein the installation of said patch library code fragment in said dynamically linked and patched library structure is operable to affect a functionality of said given function only with respect to said computer implemented process.

19. A method as recited in claim 18 wherein each retrieved import library code fragment has an import library name and said step for determining which patch library code fragments are linked to said retrieved import library code fragments includes the substeps of:
providing a list of possible patch library code fragments, each possible patch library code fragment including a patch library name;
for each possible patch library fragment, determining if said patch library name matches an import library name corresponding to one of said retrieved import library code fragments;
retrieving each patch library fragment whose patch library name matches an import library name corresponding to one of said retrieved import library code fragments.

20. A method as recited in claim 18 further including the step of retrieving said patch library code fragments which are linked to said retrieved import library code fragments.

21. A method as recited in claim 18 further including the steps of:
determining which patch library code fragments are linked to said root code fragment;
retrieving all patch library code fragments which are linked to said root code fragment; and
installing each patch indicated within said all patch library code fragments which are linked to said root code fragment.

22. A method as recited in claim 18 further including the step of generating an empty data closure wherein all fragments intended for use in said process will be installed upon retrieval, said empty data closure arranged to allocate memory for said process.

23. A method as recited in claim 22 wherein said step of retrieving all import library code fragments linked to said root code fragment includes the following substeps performed for each retrieved library:

mapping a current library into memory, said mapping generating an executable instance of said retrieved library;

creating sections for said current library; and assigning export addresses for said current library.

24. A method as recited in claim 18 further including the steps of:

retrieving all import library code fragments linked to said import library code fragments linked to said root code fragment which have not already been retrieved;

retrieving all import library code fragments linked to said patch library code fragments linked to said retrieved import library code fragments.

25. A method for statically testing a computer implemented process intended for execution within a dynamically linked computing environment, the dynamically linked computing environment capable of supporting a plurality of computer implemented processes, the dynamically linked computing environment providing a given function available for use by said plurality of computer implemented processes, the computer implemented process having a dynamically linked and patched library structure, the method comprising:

retrieving a root code fragment including root functionality for said computer implemented process, said computer implemented process using said given function, said root code fragment including a main symbol and a list of import symbols, wherein said main symbol is used to launch said computer implemented process after it has been bound to any import library code fragments that it requires;

retrieving all import library code fragments linked to said root code fragment due to the inclusion of a symbol in said library code fragment that corresponds to a symbol in said list of import symbols;

determining which patch library code fragments are linked to said retrieved import library code fragments, each of said patch library code fragments including a patch description data structure including at least one patch which affects said given function utilized by said computer implemented process, the linking of said at least one patch being operable to affect said given function only with respect to said computer implemented process;

binding all import library code fragments that are linked to said root fragment to said root fragment; and statically analyzing the functionality of said at least one patch to predict the result of a call made by said computer implemented process to said given function after said call has been re-directed to said patch.

26. A method as recited in claim 25 wherein each retrieved import library code fragment has an import library name and said step for determining which patch library code fragments are linked to said retrieved import library code fragments includes the substeps of:

providing a list of possible patch library code fragments, each possible patch library code fragment including a patch library name;

for each possible patch library fragment, determining if said patch library name matches an import library name corresponding to one of said retrieved import library code fragments;

retrieving each patch library fragment whose patch library name matches an import library name corresponding to one of said retrieved import library code fragments.

27. A method as recited in claim 25 further including the step of retrieving said patch library code fragments which are linked to said retrieved import library code fragments.

28. A method as recited in claim 25 further including the steps of:

determining which patch library code fragments are linked to said root code fragment;

retrieving all patch library code fragments which are linked to said root code fragment; and analyzing each patch indicated within said all patch library code fragments which are linked to said root code fragment.

29. A method as recited in claim 25 further including the step of generating an empty data closure wherein all fragments intended for use in said process will be installed upon retrieval, said empty data closure arranged to allocate memory for said process.

30. A method as recited in claim 29 wherein said step of retrieving all import library code fragments linked to said root code fragment includes the substep of mapping each retrieved library into memory, said mapping generating an executable instance of said retrieved library.

31. A method as recited in claim 25 further including the steps of:

retrieving all import library code fragments linked to said import library code fragments linked to said root code fragment which have not already been retrieved;

retrieving all import library code fragments linked to said patch library code fragments linked to said retrieved import library code fragments.

32. A method as recited in claim 25 further including the computer controlled step of generating a report in response to said analyzing step, said report including information regarding said predicted results of a call made by said desired process to said given function after said call has been re-directed to said patch.

33. A binding manager for binding a dynamically linked and patched library structure into a desired process intended for execution within a dynamically linked computing environment, the dynamically linked computing environment capable of supporting a plurality of computer implemented processes, the dynamically linked computing environment providing a given function available for use by said plurality of computer implemented processes, the binding manager comprising:

digital processor means;

memory means coupled to said digital processor means;

fragment retrieving means executing on said digital processor means for retrieving root code fragments and import library code fragments stored in said memory means, wherein each of said root code fragments includes root functionality for a desired process, said desired process using said given function, each root code fragment including a main symbol and a list of import symbols, wherein said main symbol is used to launch said desired process after it has been bound to any import library code fragments that it requires, and wherein said import library code fragments are linked to said root code fragment due to the inclusion of a symbol in said library code fragment that corresponds to a symbol in said list of import symbols;

fragment handling means executing on said digital processor means for determining which patch library code fragments are linked to said retrieved import library code fragments, said patch library code fragments each including a patch description data structure including at least one patch which affects said given function utilized by said desired process, the linking of said at least one patch being operable to affect said given function only with respect to said desired process;

binding means executing on said digital processor for binding all import library code fragments that are linked to said root fragment to said root fragment; and patch manager means executing on said digital processor for installing said at least one patch to affect the use of said given function by said desired process such that a call made by said desired process to said given function is re-directed to said patch.

34. A binding manager as recited in claim 33 wherein each retrieved import library code fragment has an import library name and said fragment handling means includes:

means for providing a list of possible patch library code fragments, each possible patch library code fragment including a patch library name;

match determination means responsive to said list of patch library code fragments for determining if a specific patch library name matches an import library name corresponding to one of said retrieved import library code fragments;

fragment retrieval means responsive to said match determination means for retrieving each patch library fragment whose patch library name matches an import library name corresponding to one of said retrieved import library code fragments.

35. A binding manager as recited in claim 33 further including means for generating an empty data closure wherein all fragments intended for use in said process will be installed upon retrieval, said empty data closure arranged to allocate memory for said process.

36. A binding manager as recited in claim 33 wherein said fragment retrieving means includes:

mapping means for mapping a retrieved library into memory, said mapping means operative to generate an executable instance of said retrieved library;

section means for creating sections for said retrieved library; and export means for assigning export addresses for said retrieved library.

37. A static patch analyzer for analyzing a dynamically linked and patched library structure intended for use within a dynamically linked computing environment, the dynamically linked computing environment capable of supporting a plurality of computer implemented processes, the dynamically linked computing environment providing a given function available for use by said plurality of computer implemented processes, the static patch analyzer comprising:

digital processor means;

memory means coupled to said digital processor means;

fragment retrieving means executing on said digital processor means for retrieving root code fragments and import library code fragments stored in said memory means, wherein each of said root code fragments includes root functionality for a desired process, said desired process using said given function, each root code fragment including a main symbol and a list of import symbols, wherein said main symbol is used to launch said desired process after it has been bound to any import library code fragments that it requires, and wherein said import library code fragments are linked to said root code fragment due to the inclusion of a symbol in said library code fragment that corresponds to a symbol in said list of import symbols;

fragment handling means executing on said digital processor means for determaining which patch library code fragment are linked to said retrieved import library code fragments, said patch library code fragment including a patch description data structure including at least one patch which affects said given function utilized by said desired process, the linking of said at least one patch being operable to affect said given function only with respect to said desired process;

binding means executing on said digital processor for binding all import library code fragments that are linked to said root fragment to said root fragment; and patch analyzer means for statically analyzing the functionality of said at least one patch to predict the result of a call made by said desired process to said given function after said call has been re-directed to said patch.

38. A static patch analyzer as recited in claim 37 wherein each retrieved import library code fragment has an import library name and said fragment handling means includes:

means for providing a list of possible patch library code fragments, each possible patch library code fragment including a patch library name;

match determination means responsive to said list of patch library code fragments for determining if a specific patch library name matches an import library name corresponding to one of said retrieved import library code fragments;

means responsive to said match determination means for retrieving each patch library fragment whose patch library name matches an import library name corresponding to one of said retrieved import library code fragments.

39. A static patch analyzer as recited in claim 37 further including means for generating an empty data closure wherein all fragments intended for use in said desired process will be installed upon retrieval, said empty data closure arranged to allocate memory for said process.

40. A binding manager as recited in claim 37 wherein said fragment retrieving means includes:

mapping means for mapping a retrieved library into memory, said mapping means operative to generate an executable instance of said retrieved library;

section means for creating sections for said retrieved library; and export means for assigning export addresses for said retrieved library.

41. A binding manager as recited in claim 37 further including report generation means responsive to said patch analyzer means to generate a report in response to said analyzing step, said report including information regarding said predicted results of a call made by said desired process to said given function after said call has been re-directed to said patch.

* * * * *